US009315231B2

(12) United States Patent
Gingl et al.

(10) Patent No.: US 9,315,231 B2
(45) Date of Patent: Apr. 19, 2016

(54) MUSCLE-POWERED VEHICLE HAVING AN AUXILIARY MOTOR, AND TRANSMISSION AND DRIVE UNIT THEREFOR

(71) Applicant: Bionx Europe GmbH, Weiz (AT)

(72) Inventors: Manfred Gingl, Aurora (CA); Sandor Palvolgyi, Ungersdorf/Gleisdorf (AT)

(73) Assignee: Bionx Europe GmbH, Weiz (AT)

( * ) Notice: Subject to any disclaimer, the term of this patent is extended or adjusted under 35 U.S.C. 154(b) by 0 days.

(21) Appl. No.: 14/355,911

(22) PCT Filed: Sep. 26, 2012

(86) PCT No.: PCT/AT2012/050146
§ 371 (c)(1),
(2) Date: May 2, 2014

(87) PCT Pub. No.: WO2013/067566
PCT Pub. Date: May 16, 2013

(65) Prior Publication Data
US 2014/0345421 A1    Nov. 27, 2014

(30) Foreign Application Priority Data
Nov. 10, 2011 (AT) .............................. A 1663/2011

(51) Int. Cl.
*B62M 6/55* (2010.01)
*F16H 37/06* (2006.01)

(52) U.S. Cl.
CPC .............. *B62M 6/55* (2013.01); *F16H 37/065* (2013.01); *Y10T 74/19014* (2015.01)

(58) Field of Classification Search
CPC ... B62M 6/55; F16H 37/065; Y10T 74/19014
USPC ........................................................ 180/206.4
See application file for complete search history.

(56) References Cited

U.S. PATENT DOCUMENTS 5,570,752 A    11/1996 Takata
5,829,546 A    11/1998 Tseng
(Continued)

FOREIGN PATENT DOCUMENTS

CH        593 822       8/1977
EP        0 636 538 A1  1/1995
(Continued)

OTHER PUBLICATIONS

International Preliminary Report on Patentability for PCT/AT2012/050146 dated Jun. 12, 2014.
(Continued)

*Primary Examiner* — Tony Winner
*Assistant Examiner* — Michael Stabley
(74) *Attorney, Agent, or Firm* — Hoffmann & Baron, LLP

(57) ABSTRACT

A transmission for a muscle-powered vehicle having an auxiliary motor, in particular for a pedelec, including a housing which can be fitted on the vehicle, a first drive shaft mounted in the housing for feeding in muscle power, said first drive shaft being coupled to an approximately coaxial output shaft for driving the vehicle, and further including, approximately at a right angle to said first drive shaft, a second drive shaft for connecting the auxiliary motor, which second drive shaft acts on the output shaft via an angular gear. The angular gear is formed by a crown gear on the output shaft and a sprocket on the second drive shaft, which sprocket engages in the crown gear.

20 Claims, 2 Drawing Sheets

(56) References Cited

U.S. PATENT DOCUMENTS

| | | |
|---|---|---|
| 5,901,807 A | 5/1999 | Tseng |
| 6,073,717 A * | 6/2000 | Yamamoto et al. ........ 180/206.4 |
| 6,080,073 A | 6/2000 | Liu et al. |
| 6,230,586 B1 | 5/2001 | Chang |
| 6,263,993 B1 * | 7/2001 | Lin ........................... 180/206.4 |
| 6,276,479 B1 * | 8/2001 | Suzuki et al. ............. 180/206.8 |
| 6,554,730 B1 * | 4/2003 | Sakai et al. .................... 475/195 |
| 2014/0196970 A1 * | 7/2014 | Biechele .................... 180/206.4 |

FOREIGN PATENT DOCUMENTS

| | | |
|---|---|---|
| EP | 0 820 925 A1 | 1/1998 |
| EP | 0 861 770 A1 | 9/1998 |
| EP | 0 908 379 A1 | 4/1999 |
| EP | 1 070 660 A1 | 1/2001 |
| JP | 10194186 | 7/1998 |

OTHER PUBLICATIONS

Austrian Office Action dated May 9, 2012.
ISA Written Opinion.
IPER.

\* cited by examiner

MUSCLE-POWERED VEHICLE HAVING AN AUXILIARY MOTOR, AND TRANSMISSION AND DRIVE UNIT THEREFOR

CROSS-REFERENCE TO RELATED APPLICATIONS

This application is a National Phase application of International Application No. PCT/AT2012/050146 filed Sep. 26, 2012 which claims priority to Austrian Patent Application No. A 1663/2011 filed Nov. 10, 2011, the disclosures of which are incorporated herein by reference.

BACKGROUND

The present invention relates to a transmission and a drive unit for a muscle-powered vehicle having an auxiliary motor, in particular for a pedelec, comprising a housing which can be fitted on the vehicle, a first drive shaft mounted in the housing for feeding in muscle power, said first drive shaft being coupled to an approximately coaxial output shaft for driving the vehicle, and further comprising, approximately at a right angle to said first drive shaft, a second drive shaft for connecting the auxiliary motor, which second drive shaft acts on the output shaft via an angular gear. The invention also relates to a muscle-powered vehicle having such a drive unit.

With muscle-powered vehicles having an auxiliary motor, the muscle power drive and auxiliary motor drive should be able to drive the vehicle both independently of one another and jointly, in a manner assisting one another. If the vehicle is a bicycle having an electric auxiliary motor, it is also referred to as a "pedelec". By way of example, pedelecs with wheel hub auxiliary motors are known, which can also be operated by muscle power via conventional treadles (pedals) and chain drive. Since such wheel hub auxiliary motors have to apply a relatively high torque due to the low rotational speed of the wheels, they are large and heavy.

WO 2011/113642 presents a bicycle having an auxiliary motor, in which both the pedals and the auxiliary motor act via a transmission on a common output shaft, by means of which a chain drive drives the wheel. The axes of all transmission and drive parts are parallel to one another here. Due to the intermediate transmission, the motor can indeed be smaller, however, due to the narrow space between the two pedals, a motor of conventional design can hardly be considered due to its overall length; a disc-armature motor better suited for this, as is also used in wheel hub motor drives, either has an air core however and is therefore less efficient or is equipped on its rotor periphery with permanent magnets and is therefore relatively heavy.

A transmission of the type mentioned in the introduction is described in EP 1 878 650. This document discloses an elongate auxiliary motor, which is integrated into the vehicle frame and acts via an angular gear on the crankshaft, on which the pedals also sit. The angular gear is a bevel gear, which impairs the initial setting of the pedelec during manufacture and the readjustment of the transmission during use: in the case of bevel gears, the gear play is to be set at both shafts in both axial directions thereof and this therefore cannot be implemented easily.

SUMMARY

The object of the present invention is to create a space-saving, lightweight transmission for muscle-powered and auxiliary-motor-powered vehicles which can be easily set and readjusted.

This object is achieved in accordance with a first aspect of the invention with a transmission of the type mentioned in the introduction, in which the angular gear is formed by a crown gear on the output shaft and a sprocket on the second drive shaft, which sprocket engages in the crown gear. Due to the use of a crown gear, an angular gear with large speed reduction and therefore a single-speed gear is possible; heavyweight further gear stages and parts are spared. The auxiliary motor can be arranged normal to the output shaft and has enough space to be fixed between the pedals, even in conventional design. The crown gear allows the setting and subsequent readjustment of the gear play in a rather simple manner by adjustment merely of the crown gear in the axial direction thereof or merely of the sprocket normal to the axial direction thereof; it is not necessary for this purpose to adjust the respective other part of the angular gear.

It is particularly advantageous if the first and second drive shafts are mounted rotatably in the housing and are axially fixed, and if the output shaft is a hollow shaft penetrated by the first drive shaft, on which the output shaft is mounted axially displaceably and is coupled to said first drive shaft for conjoint rotation therewith in at least one direction of rotation. Such a transmission structure is particularly compact and, due to the direct coupling of the first drive shaft to the output shaft, produces a familiar feeling in the muscle power mode. The axially fixed housing mounting of the two drive shafts enables here a particularly simple structure of the transmission. To adjust the gear play, merely the output shaft with the crown gear needs to be displaced axially; if, for example, a chain wheel for a chain drive sits directly on the output shaft, this slight axial displacement can be easily compensated for by the chain.

It is advantageous if the output shaft is additionally supported rotatably and axially displaceably on the housing. Due to such a second bearing, a high mechanical stability of the shaft mounting is achieved.

It is further particularly favourable if the mounting and coupling of the output shaft on and to the first drive shaft is formed by a first freewheel with rolling bearings and axial play. On the one hand muscle power can thus be fed directly into the output shaft, and on the other hand the output shaft can also rotate without also moving the treadles. Muscle power mode and auxiliary motor mode can thus act independently of one another on the common output shaft. The axial play provides the crown gear with the necessary freedom of movement for adjustment.

For the adjustment of the crown gear, it is particularly favourable if an adjusting ring mounted adjustably in the axial direction on the first drive shaft acts via an axial bearing on the side of the crown gear facing away from the sprocket. Such an adjusting ring, which acts uniformly all around on the crown gear, allows the displacement of the crown gear in the axial direction and in so doing avoids a jamming or wedging. The intermediate axial bearing compensates for relative movements between the crown gear and adjusting ring. In order to ensure that the crown gear rests uniformly against the adjusting ring, it is particularly advantageous here if the crown gear is spring-loaded against the adjusting ring. The crown gear can thus be adjusted in both axial directions in a defined manner using one individual adjusting ring.

In accordance with a further advantageous embodiment of the invention an adjusting screw, which sits in an end-face bore in the first drive shaft, acts on the end face of the adjusting ring via a pin that is movable in a transverse slot in the first drive shaft. This allows the adjustment of the crown gear and therefore of the entire transmission using a single screw and conventional tool. Such an adjusting screw can additionally be made particularly easily accessible from the outside if it preferably sits in the same bore which is used to anchor a treadle on the first drive shaft. In this case, there is no need for a separate bore, and, to adjust the crown gear, merely the mounting screw of the treadle has to be removed in order to obtain access to the adjusting screw.

In a second aspect the invention creates a drive unit for a muscle-powered vehicle having an auxiliary motor, in particular for a pedelec, having a transmission of the presented type and an auxiliary motor connected coaxially to the second drive shaft. Such a drive unit enables the use of an auxiliary motor of conventional design and the summation of muscle power and auxiliary motor power with all the presented advantages of the invention.

A second freewheel is preferably arranged between the second drive shaft and the auxiliary motor. The motor in pure muscle power mode therefore is not entrained in rotation. Muscle power and auxiliary motor act independently of one another on the output shaft; each of the two can be stationary if the respective other drive is to be active alone.

It is advantageous if the auxiliary motor is formed as a hollow shaft motor which is penetrated by the second drive shaft. The auxiliary motor can thus be drawn over the second drive shaft and can additionally support said second drive shaft. Here, the second freewheel may optionally be arranged in the hollow shaft of the auxiliary motor and thus may connect the auxiliary motor to the second drive shaft. This enables a particularly compact design; there is no need for further separate intermediate bearings or flanges for the second freewheel.

It is particularly advantageous if the motor housing offers access by means of an opening to the end of the second drive shaft remote from the sprocket. Due to such an opening, the play of the angular gear can be measured directly on the second drive shaft, for example by connecting a tool in a form-fitting manner through the opening in the motor housing to the second drive shaft. By turning the tool, the tooth play of the sprocket at the teeth of the crown gear can be measured or sensed; the need of a readjustment can thus be detected, or the set play can be monitored during the adjustment process.

It is favourable if the first drive shaft is equipped at each of its two ends in a manner known per se with a treadle for feeding muscle power, and if the output shaft is equipped with a chain wheel for a chain drive. The drive unit can thus be combined with a conventional pedal and chain drive.

In a third aspect the invention creates a muscle-powered vehicle having an auxiliary motor, in particular a pedelec, with a frame and a bottom bracket fitted thereon for treadles for feeding in muscle power, which is formed by a drive unit of the type presented here. Existing vehicle constructions can thus remain largely unchanged; many further mechanical drive elements on the vehicle, for example derailleur gears or hub gears, can also be retained. A simple retrofitting of existing vehicles with a transmission or a drive unit according to the invention is also possible.

BRIEF DESCRIPTION OF THE DRAWINGS

The invention will be explained in greater detail hereinafter on the basis of exemplary embodiments illustrated in the accompanying drawings, in which.

DETAILED DESCRIPTION

Figure 1:
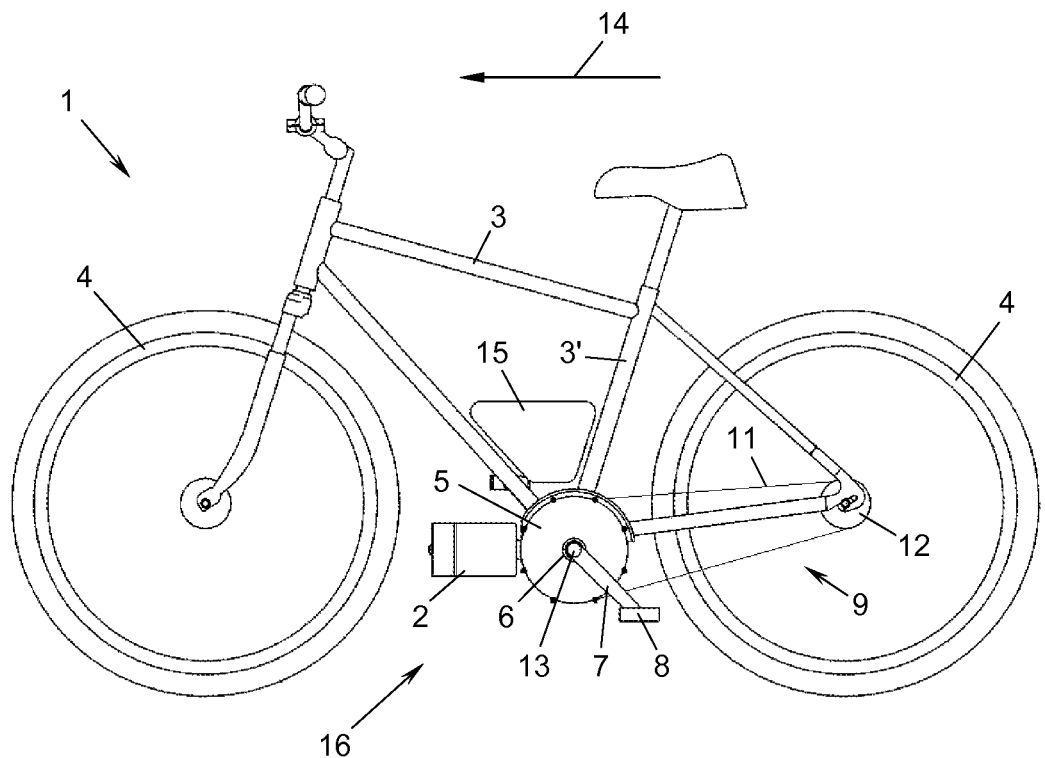
FIG. 1 shows a muscle-powered vehicle with auxiliary motor according to the invention in side view.

According to FIG. 1, a muscle-powered vehicle 1 having an auxiliary motor 2, here a bicycle with an electric auxiliary motor, or what is known as a "pedelec", comprises a frame 3 and two wheels 4. A transmission 5 is fastened on the frame 3 and serves simultaneously as a bottom bracket 6 for in each case one treadle 7 with a pedal 8 on each side of the vehicle 1 for feeding in muscle power. A chain drive 9 with a chain wheel 10 (FIG. 2) driven by the transmission 5, a chain 11 and a small sprocket 12 on the wheel 4 transmits the muscle power from the transmission 5 to the wheel 4 and therefore to the vehicle 1.

Additional force is fed by the auxiliary motor 2 into the transmission 5. The force of the auxiliary motor 2 is likewise transmitted via the chain drive 9 to the vehicle 1. As shown in FIG. 1, the auxiliary motor 2 is fitted on the transmission 5 normal to the axis 13 of the bottom bracket 6 of the treadles 7 and protrudes from the transmission 5 approximately parallel with the direction of travel 14 of the vehicle 1, but may also be arranged at an incline or vertically, for example parallel to or on/in the saddle-support tube 3' of the frame 3. In addition, an energy store 15 for supplying the auxiliary motor 2 is also fastened on the frame 3.

The vehicle 1, instead of a bicycle, could alternatively also be a muscle-powered recumbent bicycle, tandem, tricycle, etc. having an auxiliary motor. Here, the vehicle could also be a muscle-powered watercraft having an auxiliary motor, for example a pedalo. In addition, the treadles 7, instead of being formed for foot operation, could also be formed for hand operation, possibly even for one-handed operation, for example also via a hand lever, and the vehicle 1 here could be a wheelchair or the like. Instead of the chain drive 9, a belt drive or cardan drive known to a person skilled in the art could also be used in place of the chain drive 9. Instead of the illustrated electric auxiliary motor 2, a heat engine could even be used, in which case the energy store 15 would contain the fuel for the heat engine instead of a battery for an electric motor.

Figure 3:
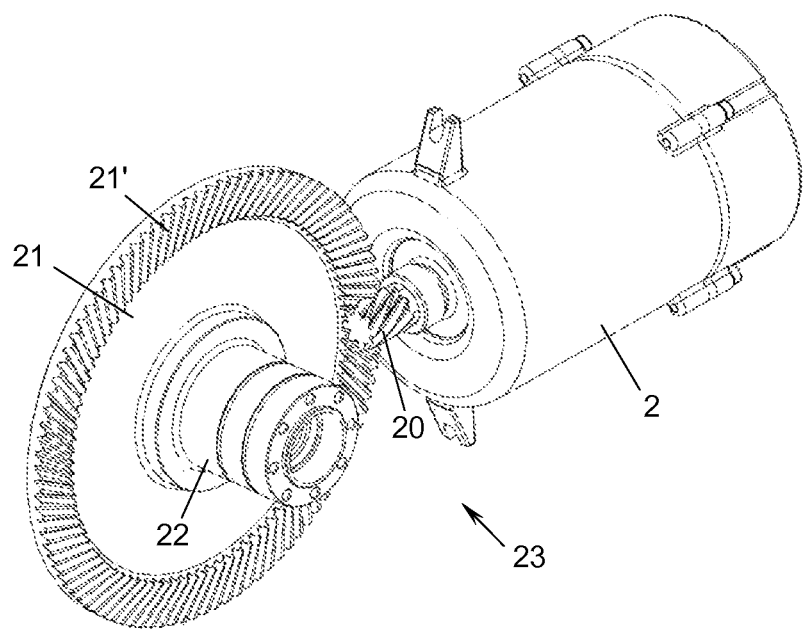
FIG. 3 shows details of the angular gear of the drive unit of FIG. 2 in a perspective view.
Figure 2:
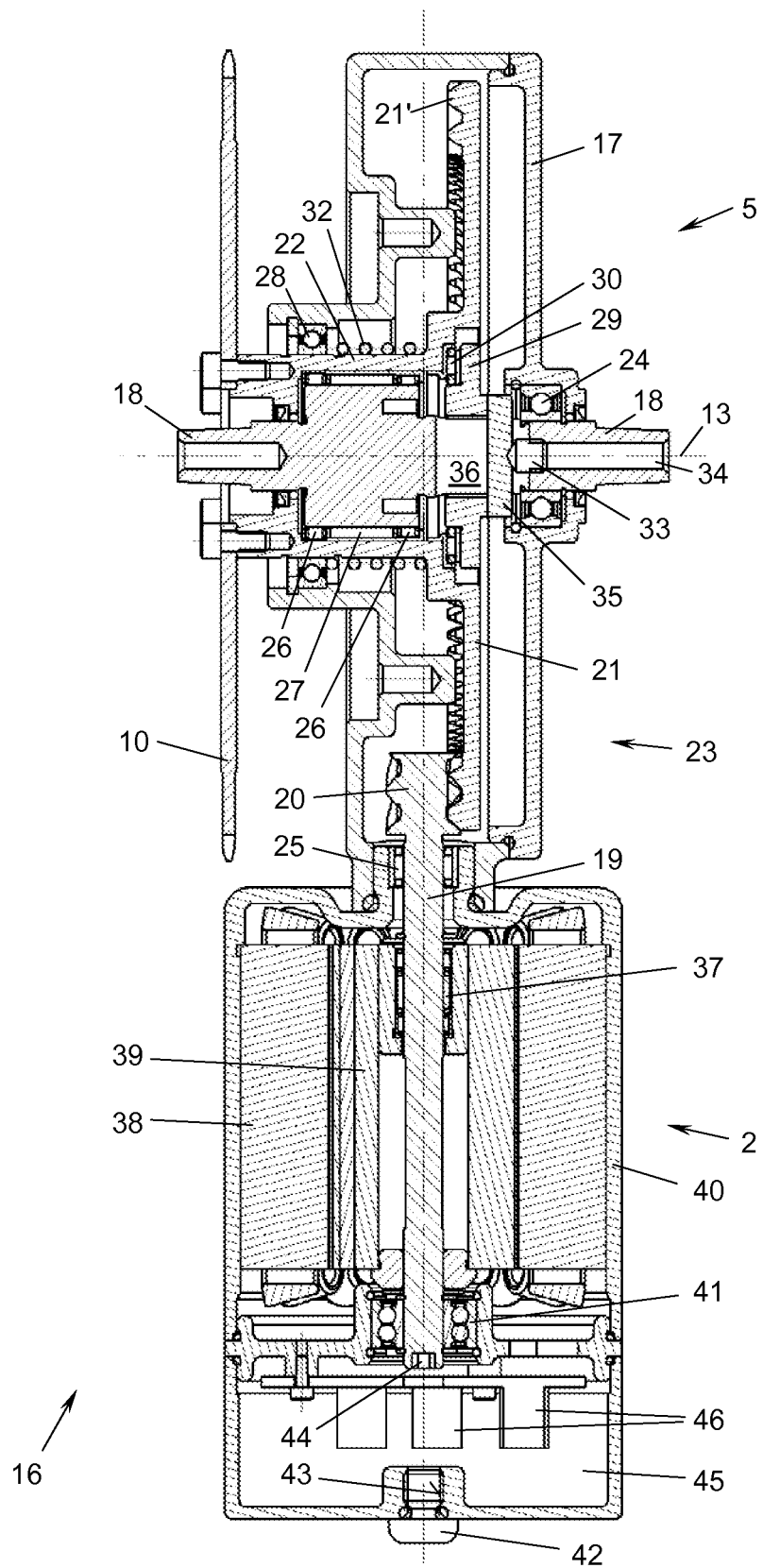
FIG. 2 shows the drive unit of the vehicle of FIG. 1 in section.

FIGS. 2 and 3 show in detail the structure and function of the drive unit 16 formed from auxiliary motor 2 and transmission 5. A first drive shaft 18 is mounted in a housing 17 of the transmission 5 and forms the bottom bracket axis 13, a treadle 7 (FIG. 1) engaging with each of the ends of said drive shaft. A second drive shaft 19 likewise mounted in the housing 17 and running approximately normal to the first drive shaft 18 feeds the force of the auxiliary motor 2 into the transmission 5. The second drive shaft 19 has a sprocket 20, which engages in a crown gear 21, that is to say meshes with the teeth 21' thereof. The crown gear 21 sits directly on the output shaft 22 of the transmission 5, which carries the chain wheel 10.

The second drive shaft 19 with the sprocket 20 and the output shaft 22 with the crown gear 21 form an angular gear 23 in the form of a crown gearhead, which is illustrated in FIG. 3. Besides the generally right angle between the drive shaft and output shaft (here the second drive shaft 19 and the output shaft 22), the approximately cylindrical shape of the sprocket 20 and the arrangement of the teeth 21' on a side face of the crown gear 21 are characteristic for such a crown gearhead. The angular gear 23 is thus insensitive to an axial shift of the sprocket 20, and a uniaxial movement, for example of the crown gear 21 in the axial direction thereof, is sufficient for the setting of the play between sprocket 20 and crown gear 21. The crown gearhead 23 is simultaneously more efficient than worm gears or hypoid bevel gears. All toothings between the sprocket 20 and crown gear 21 known per se in the art for crown gearheads can be used here, for example specifically, or as illustrated in FIG. 3, inclined toothings in involute, cycloid or other conjugated geometries. Axis angles other than normal angles may also be provided, and an axial offset between the second drive shaft 19 and output shaft 22 is also possible.

Coming back to FIG. 2, the first drive shaft 18 is mounted in (at least) one first fixed bearing 24 and the second drive shaft 19 is mounted in (at least) one second fixed bearing 25 so as to be rotatable relative to the housing and axially fixed. The output shaft 22 is formed as a hollow shaft and is penetrated by the first drive shaft 18. Here, the output shaft 22 is mounted with axial play on the first drive shaft 18 in rolling bearings 26 and is coupled to said first drive shaft for conjoint rotation therewith in the drive direction via a first freewheel 27. The exact operating principle of the first freewheel 27 will be explained in greater detail below. An optional floating bearing 28 supports the output shaft 22 axially displaceably and rotatably on the housing 17 of the transmission 5.

Instead of the rolling bearings 26, one or more sliding bearings could also be used, which allow an axial play. The first freewheel 27 is also optional; a coupling, fixed against rotation in both directions, between the first drive shaft 18 and output shaft 22 would be possible, although less comfortable, as will be explained in greater detail below. The structure of the transmission could then even be simplified further by forming the first drive shaft 18 and output shaft 22 in one piece; in this case, such a shaft however would have to be axially displaceable as a whole in the housing 17.

Due to the axial displaceability of the output shaft 22 with the crown gear 21 relative to the housing 17 and therefore relative to the sprocket 20, the play between the sprocket 20 and crown gear 21 can be set. An adjusting ring 29 is used for this purpose. The adjusting ring 29 is mounted adjustably in the axial direction on the first drive shaft 18 and engages via an axial bearing 30 with the side of the crown gear 21 facing away from the teeth 21'. When adjusting the adjusting ring 29 in the axial direction, the crown gear 21 is therefore adjusted, and the play of the angular gear 23 is thus changed. Here, a compression spring 32 drawn over the output shaft 22 and supported with respect to the housing 17 or the floating bearing 28 holds the crown gear 21 against the adjusting ring 29 or the intermediate axial bearing 30. Alternatively or additionally to the compression spring 32, a driver on the crown gear 21 could engage behind the adjusting ring 29, and the adjusting ring could thus adjust the crown gear 21 in both directions.

The adjusting ring 29 may be equipped for example with an inner thread and axially adjusted on an outer thread of the first drive shaft 18 by rotation. Alternatively, the adjusting ring 29 could also be adjustable on the housing 17, for example by means of screws penetrating the housing 17, and in so doing either may not contact the first drive shaft 18 or may be mounted thereon in a further rolling bearing with axial play.

In the case illustrated in FIG. 2, the adjusting ring 29 is adjusted by means of an adjusting screw (grub screw) 33, which sits in an end-face threaded bore 34 in the first drive shaft 18 and acts on the end face of the adjusting ring 29 via a pin 35, which is movably mounted in a transverse slot 36 in the first drive shaft 18 in the axial direction thereof. Alternatively, two or more screws for adjusting the adjusting ring 29 could also sit in two or more bores in the first drive shaft 18, or the adjusting screw 33 could lie for example in a stepped threaded part within the bore 34 and may not be formed as a grub screw.

In the embodiment according to FIG. 2, the crown gear 21 and output shaft 22 are fabricated in one piece. If they are connected to one another at least for conjoint rotation, they could however also be formed in two or more parts. Here, the output shaft 22 could be axially fixed, for example relative to the housing, and merely the crown gear 21 could be mounted axially displaceably on the output shaft 22 or in the housing 17.

The auxiliary motor 2 is connected via a (optional) second freewheel 37 to the second drive shaft 19. The two freewheels 27, 37 are oriented such that the two drive shafts 18, 19 can in each case drive the output shaft 22 independently of one another, such that the pedals 8 may be stationary in the auxiliary motor mode and in the muscle power mode of the auxiliary motor 2.

According to FIG. 2, the auxiliary motor 2 is preferably formed as a hollow shaft motor with a stator 38 and a rotor 39 and with its own housing 40 and is penetrated by the second drive shaft 19, which protrudes from the housing 17 of the transmission 5 and which may be supported at its end in a further rolling bearing 41 of the motor housing 40. If two bearings 25, 41 are provided for the second drive shaft 19, at least one of said bearings is then a floating bearing, for example the bearing 25.

The end of the second drive shaft 19 remote from the sprocket 20 is preferably accessible from the outside via an opening 43 (possibly closable by a stopper 42) in the motor housing 40. At this point, the second drive shaft 19 has a shaping 44, for example a hexagon socket, slot, cross recess, hexagon head, etc., for engaging in a form-fitting manner a tool (not illustrated) that can be introduced through the opening 43: by turning this tool, the play of the angular gear 23 between the teeth of the sprocket 20 and of the crown gear 21 can be measured or sensed, whereas it is adjusted via the adjusting screw 33. The shaping 44 could also be spared if a tool with a force fit is used.

Instead of via the opening 43, the second drive shaft 19 could also be accessible for this purpose from the side, for example in the region of the flange-mounting of the auxiliary motor housing 40 on the transmission housing 17, for example for the engagement of a spanner. This embodiment is particularly suitable for the case that the second drive shaft 19 reaches only as far as to this point, where it is coupled or flange-mounted to an output shaft (not illustrated) of the auxiliary motor 2.

In a region of the motor housing 40 facing away from the transmission 5, a free space 45 for receiving motor electronics 46 may be provided. The motor electronics 46 could alternatively sit in the energy store 15, for example together with a charging electronics for charging batteries or together with an operating unit (not illustrated), for example on the frame 3 of the vehicle 1.

The invention is not limited to the illustrated embodiments, but instead comprises all variants, combinations and modifications that fall within the scope of the accompanying claims.

What is claimed is:

1. A transmission for a muscle-powered vehicle having an auxiliary motor comprising:
    a housing which can be fitted on the vehicle,
    a first drive shaft mounted in the housing for feeding in muscle power,
    said first drive shaft being coupled to a coaxial output shaft for driving the vehicle,
    and further comprising, at a right angle to said first drive shaft, a second drive shaft for connecting the auxiliary motor, which second drive shaft acts on the output shaft via an angular gear,
wherein the angular gear is formed by a crown gear on the output shaft and a sprocket on the second drive shaft, which sprocket engages in the crown gear, wherein the crown gear includes a flat tooth-bearing surface.

2. The transmission according to claim 1, wherein the first and second drive shafts are mounted rotatably in the housing and are axially fixed, and in that the output shaft is a hollow shaft which is penetrated by the first drive shaft, on which the output shaft is mounted axially displaceably and is coupled to said first drive shaft for conjoint rotation therewith in at least one direction of rotation.

3. The transmission according to claim 2, wherein the output shaft is additionally supported rotatably and axially displaceably on the housing.

4. The transmission according to claim 2, wherein the mounting and coupling of the output shaft on and to the first drive shaft is formed by a first freewheel with rolling bearings and axial play.

5. The transmission according to claim 1, wherein an adjusting ring mounted adjustably in the axial direction on the first drive shaft engages via an axial bearing with the side of the crown gear facing away from the sprocket.

6. The transmission according to claim 5, wherein the crown gear is spring-loaded against the adjusting ring.

7. The transmission according to claim 5, wherein an adjusting screw, which sits in an end-face bore in the first drive shaft, acts on the end face of the adjusting ring via a pin, which is movable in a transverse slot in the first drive shaft.

8. A drive unit for a muscle-powered vehicle having an auxiliary motor, comprising a transmission according to claim 1 and an auxiliary motor connected coaxially to the second drive shaft.

9. The drive unit according to claim 8, wherein a second freewheel is arranged between the second drive shaft and the auxiliary motor.

10. The drive unit according to claim 8, wherein the auxiliary motor is formed as a hollow shaft motor which is penetrated by the second drive shaft.

11. The drive unit according to claim 8, wherein a second freewheel is arranged between the second drive shaft of the auxiliary motor,
wherein the auxiliary motor is formed as a hollow shaft motor which is penetrated by the second drive shaft, and
wherein the second freewheel is arranged in the hollow shaft of the auxiliary motor and thus connects the auxiliary motor to the second drive shaft.

12. The drive unit according to claim 8, wherein the motor housing, by means of an opening, provides access to the end of the second drive shaft facing away from the sprocket.

13. The drive unit according to claim 8, wherein the first drive shaft is equipped at each of its two ends with a treadle for feeding in muscle power, and the output shaft is equipped with a chain wheel for a chain drive.

14. A muscle-powered vehicle with auxiliary motor, comprising a frame and a bottom bracket fitted thereon for treadles for feeding in muscle power, wherein the bottom bracket is formed by a drive unit according to claim 8.

15. The muscle-powered vehicle according to claim 14, wherein the muscle-powered vehicle is a pedelec.

16. A drive unit for a muscle-powered vehicle having an auxiliary motor, comprising a transmission according to claim 2 and an auxiliary motor connected coaxially to the second drive shaft.

17. A drive unit for a muscle-powered vehicle having an auxiliary motor, comprising a transmission according to claim 5 and an auxiliary motor connected coaxially to the second drive shaft.

18. The transmission according to claim 1, wherein the sprocket is cylindrical.

19. A transmission for a muscle-powered vehicle having an auxiliary motor comprising:
a housing which can be fitted on the vehicle,
a first drive shaft mounted in the housing for feeding in muscle power,
said first drive shaft being coupled to a coaxial output shaft for driving the vehicle,
and further comprising, at a right angle to said first drive shaft, a second drive shaft for connecting the auxiliary motor,
which second drive shaft acts on the output shaft via an angular gear,
wherein the angular gear is formed by a crown gear on the output shaft and a sprocket on the second drive shaft, which sprocket engages in the crown gear, wherein the first and second drive shafts are mounted rotatably in the housing and are axially fixed, and in that the output shaft is a hollow shaft which is penetrated by the first drive shaft, on which the output shaft is mounted axially displaceably and is coupled to said first drive shaft for conjoint rotation therewith in at least one direction of rotation, and wherein the mounting and coupling of the output shaft on and to the first drive shaft is formed by a first freewheel with rolling bearings and axial play.

20. A transmission for a muscle-powered vehicle having an auxiliary motor comprising:
a housing which can be fitted on the vehicle,
a first drive shaft mounted in the housing for feeding in muscle power,
said first drive shaft being coupled to a coaxial output shaft for driving the vehicle,
and further comprising, at a right angle to said first drive shaft, a second drive shaft for connecting the auxiliary motor,
which second drive shaft acts on the output shaft via an angular gear,
wherein the angular gear is formed by a crown gear on the output shaft and a sprocket on the second drive shaft, which sprocket engages in the crown gear, and wherein an adjusting ring mounted adjustably in the axial direction on the first drive shaft engages via an axial bearing with the side of the crown gear facing away from the sprocket.

* * * * *